(No Model.)

R. I. FRAMBES.
LEVEL.

No. 304,633. Patented Sept. 2, 1884.

Witnesses
W. E. Chaffee
J. P. Town

Richard I. Frambes
Inventor
By Connolly Bros.
Attys

UNITED STATES PATENT OFFICE.

RICHARD I. FRAMBES, OF BAKERSVILLE, NEW JERSEY.

LEVEL.

SPECIFICATION forming part of Letters Patent No. 304,633, dated September 2, 1884.

Application filed February 19, 1884. (No model.)

*To all whom it may concern:*

Be it known that I, RICHARD I. FRAMBES, a citizen of the United States, residing at Bakersville, in the county of Atlantic and State of New Jersey, have invented certain new and useful Improvements in Levels; and I do hereby declare the following to be a full, clear, and exact description of the invention, reference being had to the accompanying drawings, which form part of this specification, in which—

Figure 1:
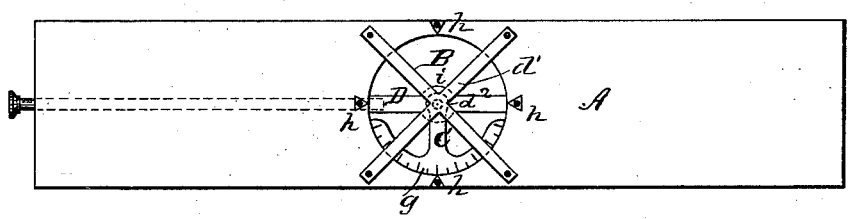
Figure 2:
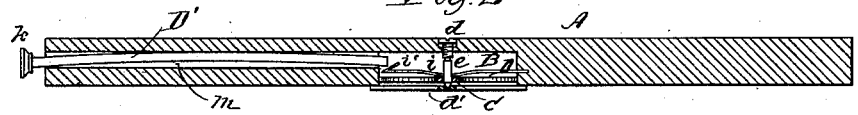
Figure 3:
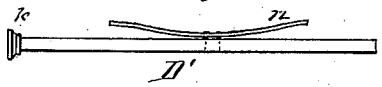

Figure 1 is a side view of my invention. Fig. 2 is a horizontal sectional view, and Fig. 3 is a detail view.

This invention has relation to pendulum-levels or clinometers; and it consists in the novel construction and arrangement of parts, as hereinafter described, having reference particularly to the provision of means by which the pendulum may be locked in any position to facilitate a reading of the angle after the angle has been removed from its setting.

Referring to the accompanying drawings, A designates the body of the level, of the usual rectangular form of which spirit-levels are made.

B represents a circular cavity formed in one of the sides of the piece A for the reception of the pendulum or arm C, supported or fixed upon a pivot, $e$, which has conical ends having their bearings, respectively, in the adjustable screw $d$ and the skeleton frame $d'$. The pendulum carries a segmental weight, $g$, upon which are marked the graduations to indicate the angles or inclinations, while at intervals of a quarter-circle around the cavity B are arranged points $h$, which, by coincidence with the graduations on the segment, determine the angle or inclination of the surface upon which the level is laid. The frame $d'$ consists of four strips or arms united at the center $d^2$, and fastened at their extremities to the side of the level by pins, nuts, or screws. The points $h$ are fixed between the arms, and the finding or indication of the level is unobstructed.

D designates a spring-brake fastened at one end to the level and traversing the cavity B diametrically and behind the pendulum, the pivot $e$ passing through the concavo-convex center part, $i$. A beveled head or projection, $i'$, is formed on the free end of the spring.

D' designates a rod passing lengthwise through a channel, $m$, in one half of the block A and entering the cavity B back of the spring end $i'$. A knob or thumb-piece, $k$, is fitted to the outer end of the rod. By pressing the rod inwardly the spring D is forced against the pendulum and the latter locked in any position; hence the level may be applied to surfaces which prevent the angle being read while the level is in position and the pendulum locked, allowing the indication to be read after the level has been removed. The rod D' should be made to bind in the channel $m$. This can be provided for by slightly bending the rod, or by the employment of a spring, $n$, as shown in Fig. 3.

What I claim as my invention is as follows:

The combination, with the oblong block A, containing the pendulum C within the cavity B, and the spring-brake D, adapted to impinge against said pendulum, of the rod D', extending through a longitudinal opening, $m$, in said block, and adapted to be manipulated from the end thereof to operate the said brake, substantially as described.

In testimony that I claim the foregoing I have hereunto set my hand this 13th day of February, 1884.

RICHARD I. FRAMBES.

Witnesses:
DANIEL E. COLLINS,
JOB FRAMBES.